Patented Oct. 15, 1935

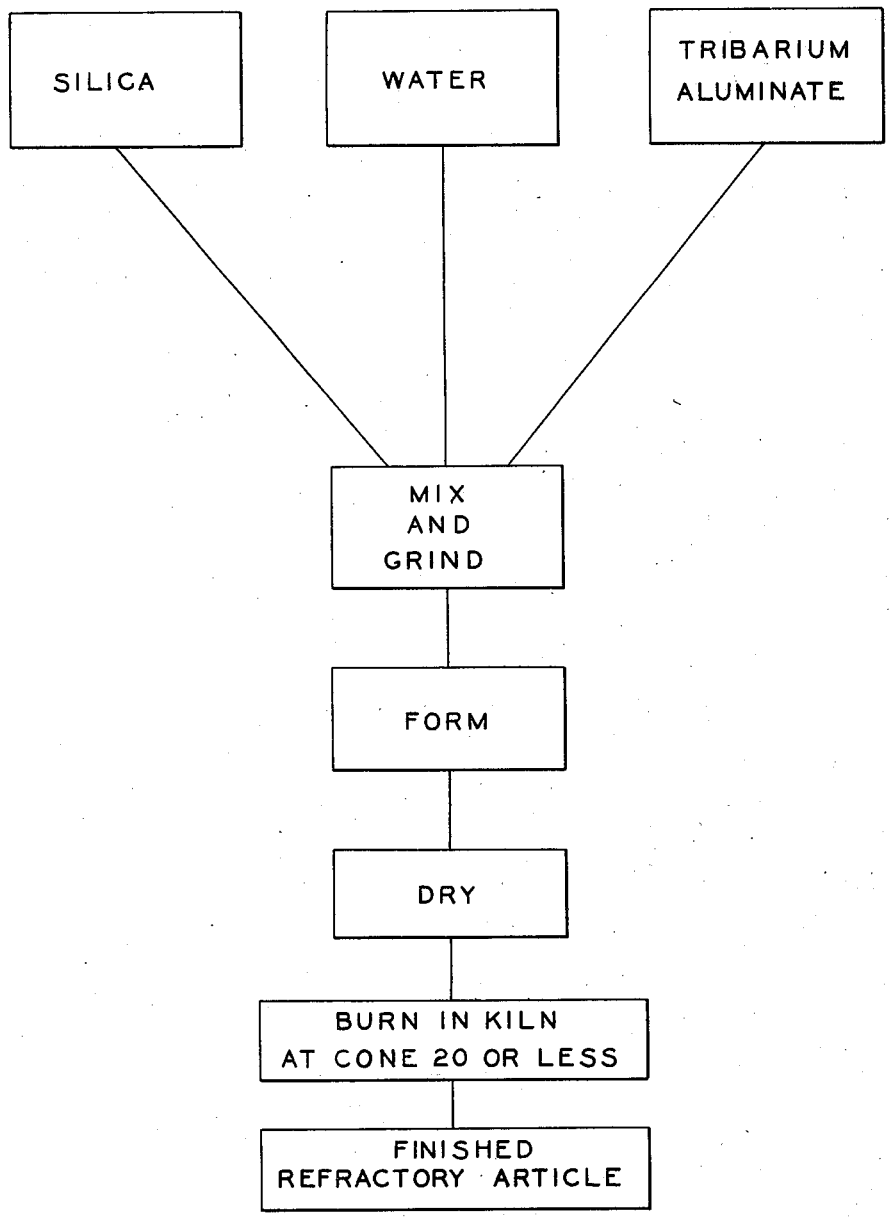

2,017,723

UNITED STATES PATENT OFFICE 2,017,723

FIRED SILICEOUS TRIBARIUM ALUMINATE REFRACTORY

John M. McKinley, East Cleveland, and Willard K. Carter, Columbus, Ohio, assignors to National Aluminate Corporation, Chicago, Ill., a corporation of Delaware Application September 25, 1933, Serial No. 690,882

6 Claims. (Cl. 106—9)

The present invention relates to improvements in the production of siliceous refractory articles such as fire-brick and the like.

One of the primary objects of the invention is to improve both the green and the fired properties of siliceous refractories, such for example as the green strength thereof, as well as to enhance the final hardness and resistance to high temperature and spalling, and to improve the mechanical strength and thermal stability.

A further object of the invention is to produce the effects herein immediately above outlined by employing barium aluminate, in conjunction with siliceous matter, to produce a moldable ceramic mass which on drying and subsequent firing will have the stated desirable properties.

A further object of the invention concerns a process for the production of a siliceous refractory ware by incorporating barium aluminate with a mass of siliceous particles, shaping the resulting mixture, and firing the same.

Still a further object of the invention is to produce a fired siliceous ceramic ware in which the silica has been fixed or stabilized as far as possible in a form resistant to subsequent change when the ware is again subjected to high temperatures in use and to insure the predominance therein of this form of silica.

Further objects of the invention will appear from the detailed description and claims hereinbelow.

In order that the basic features of the invention may be more readily appreciated, and in conformance with the regulations in such cases made and provided by the United States Patent Office, a single sheet of drawings in the form of a flow sheet is made a part of the present specification. In this drawing, Figure 1, there is shown diagrammatically the process which leads to the desired products.

The essence of the present invention lies in the discovery, and the practical application thereof, that barium aluminate, especially the tribarium aluminate, has rather remarkable properties of modifying the physical condition of fired refractory ware consisting preponderantly of silica, as well as of considerably improving the working properties of the intermediate masses employed for the forming of ceramic refractory ware consisting mainly of silica, such, for example, as greatly increase the green strength of the ware so that it may be handled with less need of care when being placed into the kilns for burning or firing.

In its simplest terms, the invention comprises adding barium aluminate to the usual mixtures of silica and water that form the first step in producing refractory ware from this raw material. The invention, however, is also concerned with the finished products resulting from such admixture, and with the fired products thereof.

As an example of how the present invention may be practiced, the following procedure will lead to satisfactory results, although it should distinctly be understood that the invention is not to be limited by the numerical data given.

The siliceous raw material may conveniently be ganister, which is roughly crushed and then charged into a wet-pan wherein it is mixed with sufficient water so that upon grinding it will form a damp moldable mass. The grinding in the said wet-pan is continued until the material has acquired the desired degree of comminution, which latter is expressed by the screen analysis given hereinbelow. During the grinding, a suitable quantity of barium aluminate is added to the material in the wet-pan, the purpose of this being to secure as thorough an intermingling of the ingredients as possible. Ordinarily, about 11½ parts of water and 2 parts of barium aluminate are employed for each 100 parts of ganister (all figures are by weight).

In order to get the very best results, it is desirable to grind the ganister and the water until the desired grain-size has been attained and then to add the tribarium aluminate and continue the grinding a short time so as to produce a sort of coating over the wet ganister particles. This previous grinding saturates the ganister with water and thus prevents the otherwise unavoidable waste of barium aluminate which would enter the pores of the ganister, where it would not serve any useful purpose.

After the mixture in the wet-pan has acquired the desired degree of comminution, it is removed therefrom and thereupon given the shape of the article that is to be made, such, for instance, as a fire-brick or furnace-lining tile. The forming is preferably accomplished by forcing, hammering or pressing the damp mixture into suitable molds, thus yielding the required wet shapes, which are then removed from the molds and allowed to dry for from 24 to 36 hours. After drying, the thus formed green articles are placed in a kiln and fired, the firing temperature being carried to as high as about cone 20, which corresponds substantially to 1520° C. or lower. The shaping and firing steps are those already well established in the art of making siliceous refractory ware, and no particular precautions need to be observed.

The advantages of the present invention will become apparent to those skilled in the art of producing siliceous ceramics by the behavior of the mixture of silica, barium aluminate and water, for the mass will set up or become firm much faster than would a mass in which, for example, lime is depended upon as a bond for the siliceous particles. When using tribarium aluminate, the mass will "set up" to a comparable firmness in about one hour, as compared with six hours when lime is used. During the drying operation another new and quite unexpected result will make itself evident. This consists in the formation upon the drying surfaces of the green drying article, of a crystalline skin which aids in protecting the green article against chipping and crumbling, so that the formed articles retain the shape given them in the molds with greater fidelity and may be safely subjected to reasonable mechanical shock and rough handling.

Still another advantage arises from the discovery that the addition of tribarium aluminate to water and silica mixtures such as have been described makes possible the use of greater percentages of silica aggregate of considerably larger diameter than if possible if lime is used as the bonding admixture. The aggregate dimension predetermines to a great extent the molding behavior and green properties of the ware as well as the fired properties. The advantages of tribarium aluminate in increasing the allowable variation in the size of silica aggregate will be apparent.

Another very important advantage arises from the discovery that a much shorter drying period and much lower drying temperatures are required to produce a comparable green condition allowing safe setting in the kiln for firing than is the case with similar lime bonded ware. This produces a flexibility in the green handling procedure of the ware contributing materially to a lower production cost.

The dry strength of the green ware is also considerably greater than in the case where lime is used as a bonding ingredient, and thus there is less breakage when the articles are handled, as in placing them into the firing kiln. This is a very decided advantage.

During the firing it has been determined that there is a formation of a very viscous glass-like binder which in ware fired to cone 19 is small in amount but completely dispersed throughout the mass. In the final product it has been found that this glass-like binder (under petrographic examination) has the characteristics of vitreous silica through which is dispersed very fine grained tridymite crystals. The character of this crystallization as well as degree of dispersion of the bonding material produces a type of structure which is new and novel and very advantageous in silica refractories. It has also been found that the silica aggregate has maintained a condition which is not expected to result from the treatment to which it was subjected; namely, that the larger quartz grains, which have remained in the quartz phase during the firing, have not undergone a shattering with reorientation as is the case in lime bonded silica refractories. Instead, it will be found that there has occurred a shattering of the larger quartz particles which has taken place in such a manner and at such a stage in the firing that, possibly due to the resistance encountered from the viscous melt present, this shattering does not in the slightest rupture or disturb the desired homogeneity of the fired product. Instead, it is found that the shattered fragments retain their original orientation with respect to the aggregate from which they originate. Microscopic examination divulges that neither the original aggregate nor the shattered fragments appear to have undergone any appreciable solution in the glassy phase, but the penetration of the glass-like phase is observed in the interstices of the shattered aggregate, with the characteristic crystallization observed in the surrounding bond. This is an especially novel and unexpected result inasmuch as there is a complete internal bond in the shattered crystal, consisting of a high viscosity glass-like matrix, which when formed tends to produce an unusually stable quartz condition. We believe that never before in the art has it been possible to subject silica to the processing described and retain a physically stable quartz condition, or at least to produce such a state in any appreciable percentage of such a mixture without deleteriously affecting the desired properties. The product obtained also has a higher fusing point as determined by the standard P. C. E. test. For example, cones formed by the standard methods from the fired articles will be found to fuse at about 1740° to 1760° C., as compared with ware from similar siliceous raw material made with a lime bond, which latter fuse at from 1650° to 1680° C. The difference is about equal to two standard cones.

There is also a marked difference in the porosity and density as well as specific gravity of the finished articles, thus:

|  | Normal lime-bonded ware | Tribarium aluminate bonded ware |
| --- | --- | --- |
| Porosity | 24.41% | 27.03% |
| Specific gravity | 2.304 | 2.334 |
| Apparent density | 1.741 | 1.703 |

Comparison between lime-bonded siliceous refractory ware and that made in accordance with the present invention also shows the remarkable improvement resulting from the use of the tribarium aluminate. Thus, the modulus of rupture, indicative of the transverse breaking strength in pounds per square inch, and crushing strengths on the same basis are as follows:

|  | Lime-bonded | Tribarium aluminate bonded |
| --- | --- | --- |
| Breaking strength | 38.83 to 52.31 average 46.47. | 54.0 to 60.75 average 59.06. |
| Crushing strength (first failure taken as criterion) | 58.10 93.00 91.20 | 124.5 153.4 106.7 |

It has also been determined that the refractory ware bonded with the tribarium aluminate is much more resistant to spalling, particularly through a temperature range lying between 700° and 850° C., which is important, as ordinary siliceous refractory ware such as is bonded with lime usually shows considerable spalling through this critical range, which is acquired by furnaces and converters during the firing-up period. The cause of this effect is readily apparent to those skilled in the art when they consider the stability produced in the aggregate and the relatively smaller thermal coefficient of volume expansion of barium-alumina-silica glass as compared with calcium-silica glass.

It has not as yet been definitely determined just what reactions take place during the setting-up, drying and firing of the ware, but it is well known that tribarium aluminate when moistened or dispersed or dissolved in water undergoes changes caused by the action of the water. This probably accounts for the appearance of the crystalline deposit or skin on the formed ware during the drying stages and undoubtedly contributes to the green strength of the dried ware. By carefully following up the transformation that takes place during firing, it has been noticed, as a result of a petrographic analysis of a section, that in the finished product there is a distinct cementing phase, undoubtedly consisting of a complex mineral or glass containing the elements barium, silicon, aluminum, and oxygen.

As a further guidance to those wishing to practice the present invention, it may be stated that the data given above has been obtained from a highly siliceous ganister, containing about 97% of silica, that has been ground in the wet-pan to give the following screen analysis:

| Mesh per inch | Per cent retained | Per cent through |
|---|---|---|
| 3 |  | 100.0 |
| 4 | 0.2 | 99.8 |
| 6 | 5.0 | 94.8 |
| 8 | 10.4 | 84.4 |
| 10 | 7.9 | 76.5 |
| 14 | 4.9 | 71.6 |
| 20 | 3.0 | 68.6 |
| 28 | 2.9 | 65.7 |
| 35 | 4.3 | 61.4 |
| 48 | 6.5 | 54.9 |
| 65 | 9.9 | 45.0 |
| 100 | 9.5 | 35.5 |
| 150 | 6.2 | 29.3 |
| 200 | 4.3 | 25.0 |
|  | 25.0 |  |

While barium aluminate has been mentioned in a generic sense, it is particularly the tribarium aluminate that has been employed in the work upon which the above data are based. This tribarium aluminate is now an article of commerce and has a theoretical composition expressed by the formula $3BaO.Al_2O_3$. This composition cannot, however, be taken as absolutely representing the material, inasmuch as a number of other barium aluminates exist. However, the commercial forms of tribarium aluminate now obtainable are quite uniform in composition. The total solubility of such tribarium aluminates in hot water ranges from 70% to 72%. Careful experiments have conclusively demonstrated the fact that no similar results in practicing the present invention can be obained when using, for example, barium oxide and aluminum oxide; and it is only when the compound, barium aluminate, and preferably tribarium aluminate, is used that the advantages of the invention become apparent. In other words, merely adding the raw materials which might form tribarium aluminate will not work. Furthermore, there should be nothing in the mixture which would interfere with the barium aluminate, such as materials that would decompose it by metathesis. Thus it has already been proposed to add barium aluminate to argillaceous ceramic masses for the purpose of preventing efflorescence and scumming, but in such cases the barium aluminate is completely decomposed by interaction with soluble materials in the clay from which the ceramic masses are mainly composed. The purpose of the barium aluminate in such cases is for the purpose of rendering soluble salts insoluble by conversion into insoluble barium salts or insoluble aluminates. In the present invention, however, only siliceous materials and water are the other ingredients, and thus the tribarium aluminate remains in the dried mass as such; and it is not until the ware is fired that any reactions between the siliceous matter and the tribarium aluminate occur. The only reaction taking place prior to the firing is the hydrolysis already briefly mentioned. It is, however, desired to keep this hydrolysis down to a minimum, and therefore it is recommended that only ordinary cold water be used in effecting the incorporation of the barium aluminate with the siliceous material.

In the claims the term "highly siliceous" is used to describe commercially available forms of silica (silicon dioxide) such as are exemplified by quartz, ganister and the so-called "siliceous fireclays", which latter as described by Alfred B. Searle in his 1917 Edition of Ceramics, page 93 as follows:—"These materials contain 75 to 99 per cent of silica. Some of these materials correspond to silica which contains 10 per cent or more of clay, together with a small amount of impurities. The most important of these are * * * * quartz pebbles found in limestone districts * * * * ganisters of the lower coal measures".

What it is desired to protect by Letters Patent is as follows:

1. The process of bonding highly siliceous particles to produce refractory articles which comprises the steps of mixing said particles with an aqueous dispersion of barium aluminate, and drying and firing the resultant mixture.

2. The process of producing highly siliceous refractory articles which comprises mixing siliceous particles with a solution of tribarium aluminate to form a moldable mass, molding articles from said mass, drying said articles, and firing the same.

3. The process of producing shaped fired refractory ware which comprises grinding together ganister, tribarium aluminate and water to form a moldable mass, forming said mass into shapes, drying the latter, and then firing the same.

4. A fired refractory article initially consisting substantially of highly siliceous particles, and tribarium aluminate.

5. A fired refractory article initially comprising ganister and tribarium aluminate.

6. The process of producing highly siliceous refractory articles which comprises mixing highly siliceous particles with tribarium aluminate and water, forming objects from the resulting mixture, drying the same, and firing the same.

JOHN M. McKINLEY.
WILLARD K. CARTER.